(12) United States Patent
Howard

(10) Patent No.: US 9,158,502 B2
(45) Date of Patent: Oct. 13, 2015

(54) SYSTEM AND METHOD FOR COMMUNICATING BETWEEN VIEWERS OF A HIERARCHICAL SOFTWARE DESIGN

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 0 days.

(21) Appl. No.: 14/253,644

(22) Filed: Apr. 15, 2014

(65) Prior Publication Data

US 2014/0344773 A1 Nov. 20, 2014

Related U.S. Application Data

(60) Provisional application No. 61/812,192, filed on Apr. 15, 2013.

(51) Int. Cl.
*G06F 9/44* (2006.01)
*H04L 12/58* (2006.01)

(52) U.S. Cl.
CPC .. *G06F 8/00* (2013.01); *G06F 8/20* (2013.01); *G06F 8/34* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 6,289,502 B1 * | 9/2001 | Garland et al. | 717/104 |
| 6,301,686 B1 * | 10/2001 | Kikuchi et al. | 716/122 |
| 6,317,864 B1 * | 11/2001 | Kikuchi et al. | 716/122 |
| 6,370,681 B1 * | 4/2002 | Dellarocas et al. | 717/110 |
| 6,385,758 B1 * | 5/2002 | Kikuchi et al. | 716/122 |
| 7,343,594 B1 * | 3/2008 | Metzgen | 717/140 |
| 7,565,643 B1 * | 7/2009 | Sweet et al. | 717/121 |
| 7,613,599 B2 * | 11/2009 | Bade et al. | 703/14 |
| 7,676,294 B2 * | 3/2010 | Baier et al. | 700/108 |
| 7,788,646 B2 * | 8/2010 | Ward | 717/132 |
| 7,890,919 B1 * | 2/2011 | Williams | 717/100 |
| 8,099,788 B2 * | 1/2012 | Munday | 726/27 |
| 8,484,561 B1 * | 7/2013 | Lemonik et al. | 715/255 |
| 8,887,134 B2 * | 11/2014 | Weatherhead et al. | 717/121 |
| 2002/0170042 A1 * | 11/2002 | Do et al. | 717/143 |
| 2003/0192029 A1 * | 10/2003 | Hughes | 717/101 |
| 2004/0019875 A1 * | 1/2004 | Welch | 717/109 |
| 2004/0088677 A1 * | 5/2004 | Williams | 717/104 |
| 2004/0117749 A1 * | 6/2004 | Lalonde et al. | 716/11 |
| 2004/0125134 A1 * | 7/2004 | Ozasa et al. | 345/751 |
| 2004/0133445 A1 * | 7/2004 | Rajan et al. | 705/1 |
| 2004/0237066 A1 * | 11/2004 | Grundy et al. | 717/104 |
| 2005/0005258 A1 * | 1/2005 | Bhogal et al. | 717/102 |
| 2005/0060687 A1 * | 3/2005 | Ghazaleh et al. | 717/123 |
| 2005/0108685 A1 * | 5/2005 | Ta | 717/120 |
| 2007/0006126 A1 * | 1/2007 | Calkins et al. | 717/103 |
| 2007/0089100 A1 * | 4/2007 | Morris et al. | 717/139 |
| 2007/0130561 A1 * | 6/2007 | Siddaramappa et al. | 717/106 |

(Continued)

FOREIGN PATENT DOCUMENTS

CA 2256931 A1 * 6/2000

*Primary Examiner* — Isaac T Tecklu
(74) *Attorney, Agent, or Firm* — Lathrop & Gage LLP

(57) ABSTRACT

A system and method for tagging objects in a software design space includes a visual representation generator that presents a visual representation of a software design to a user, and a tag manager that is operable to allow the user to create and manage tags of each object within the software design space. Certain tags are only visible to users having specific access rights to the tag.

14 Claims, 4 Drawing Sheets

(56) References Cited

U.S. PATENT DOCUMENTS

| | | | |
|---|---|---|---|
| 2007/0226687 A1* | 9/2007 | Fallen-Bailey et al. | 717/110 |
| 2007/0234290 A1* | 10/2007 | Ronen et al. | 717/120 |
| 2007/0250810 A1* | 10/2007 | Tittizer et al. | 717/110 |
| 2008/0052671 A1* | 2/2008 | Plante et al. | 717/114 |
| 2008/0109785 A1* | 5/2008 | Bailey | 717/109 |
| 2008/0196000 A1* | 8/2008 | Fernandez-Ivern et al. | 717/101 |
| 2008/0235655 A1* | 9/2008 | Defour et al. | 717/104 |
| 2008/0288914 A1* | 11/2008 | Schmitter | 717/101 |
| 2009/0235226 A1* | 9/2009 | Murthy et al. | 717/104 |
| 2009/0276752 A1* | 11/2009 | Sharma | 717/103 |
| 2010/0023914 A1* | 1/2010 | Sahouria et al. | 716/19 |
| 2010/0037203 A1* | 2/2010 | Limburn | 717/105 |
| 2010/0050160 A1* | 2/2010 | Balasubramanian | 717/126 |
| 2010/0058291 A1* | 3/2010 | Hahn et al. | 717/113 |
| 2011/0167409 A1* | 7/2011 | Schadow | 717/123 |
| 2012/0144364 A1* | 6/2012 | Lau et al. | 717/103 |
| 2013/0254743 A1* | 9/2013 | Howard | 717/123 |
| 2013/0254751 A1* | 9/2013 | Howard | 717/136 |
| 2014/0130012 A1* | 5/2014 | Weatherhead et al. | 717/120 |
| 2014/0258970 A1* | 9/2014 | Brown et al. | 717/103 |
| 2014/0258972 A1* | 9/2014 | Savage et al. | 717/106 |
| 2014/0304679 A1* | 10/2014 | Kishnani | 717/106 |
| 2014/0309765 A1* | 10/2014 | Blanchfield, Jr. | 700/119 |
| 2014/0372979 A1* | 12/2014 | Ross et al. | 717/120 |

* cited by examiner

*FIG. 4*

*FIG. 5*

SYSTEM AND METHOD FOR COMMUNICATING BETWEEN VIEWERS OF A HIERARCHICAL SOFTWARE DESIGN

RELATED APPLICATIONS

This application claims priority to U.S. Provisional Application Ser. No. 61/812,192, filed Apr. 15, 2013 and which is incorporated by reference herewith.

BACKGROUND

During creation of software designs, it is extremely important to have clear communication between developers of the software design.

SUMMARY OF THE INVENTION

Being able to quickly discern an objects completeness allows the developers to focus their attention where needed. This decreases design time and increases personnel deployment efficiency.

BRIEF DESCRIPTION OF THE FIGURES

FIG. 4 shows an exemplary tag popup window generated by the tag manager of FIG. 1, in one embodiment.

FIG. 5 shows an exemplary access popup window for managing the access data of FIG. 1, in one embodiment.

DETAILED DESCRIPTION OF THE EMBODIMENTS

Definitions:

The following definitions provide guidelines for interpretation of the terms below as used herein:

Function—a software routine, or more simply an algorithm that performs one or more data transformations.

Control Kernel—A control kernel, also known as a "control" and/or a "control transform," is a software routine or function that contains the following types of computer-language constructs: subroutine calls, looping statements (for, while, do, etc.), decision statements (if-then-else, etc.), and branching statements (goto, jump, continue, exit, etc.).

Process Kernel—A process kernel, also known as a "process" and a "process transform," is a software routine or function that does not contain the following types of computer-language constructs: subroutine calls, looping statements, decision statements, or branching statements. Information is passed to and from a process kernel via memory (e.g., RAM).

State Machine—A state machine, as used herein, is a two-dimensional network that links together all associated control kernels into a single non-language construct that activates process kernels in the correct order. The process kernels form the "states" of the state-machine and the activation of those states form the state transitions. This eliminates the need for software linker-loaders.

State Machine Interpreter—a State Machine Interpreter is a method whereby the states and state transitions of a state machine are used as active software, rather than as documentation.

Finite state machine—A finite state machine is an executable program constructed from the linear code blocks resulting from transformations, where the transformation-selection conditions are state transitions constructed from the control flow.

Terminator—A terminator is an event that occurs outside the scope of the current system or function.

Computing Environment

Figure 1:
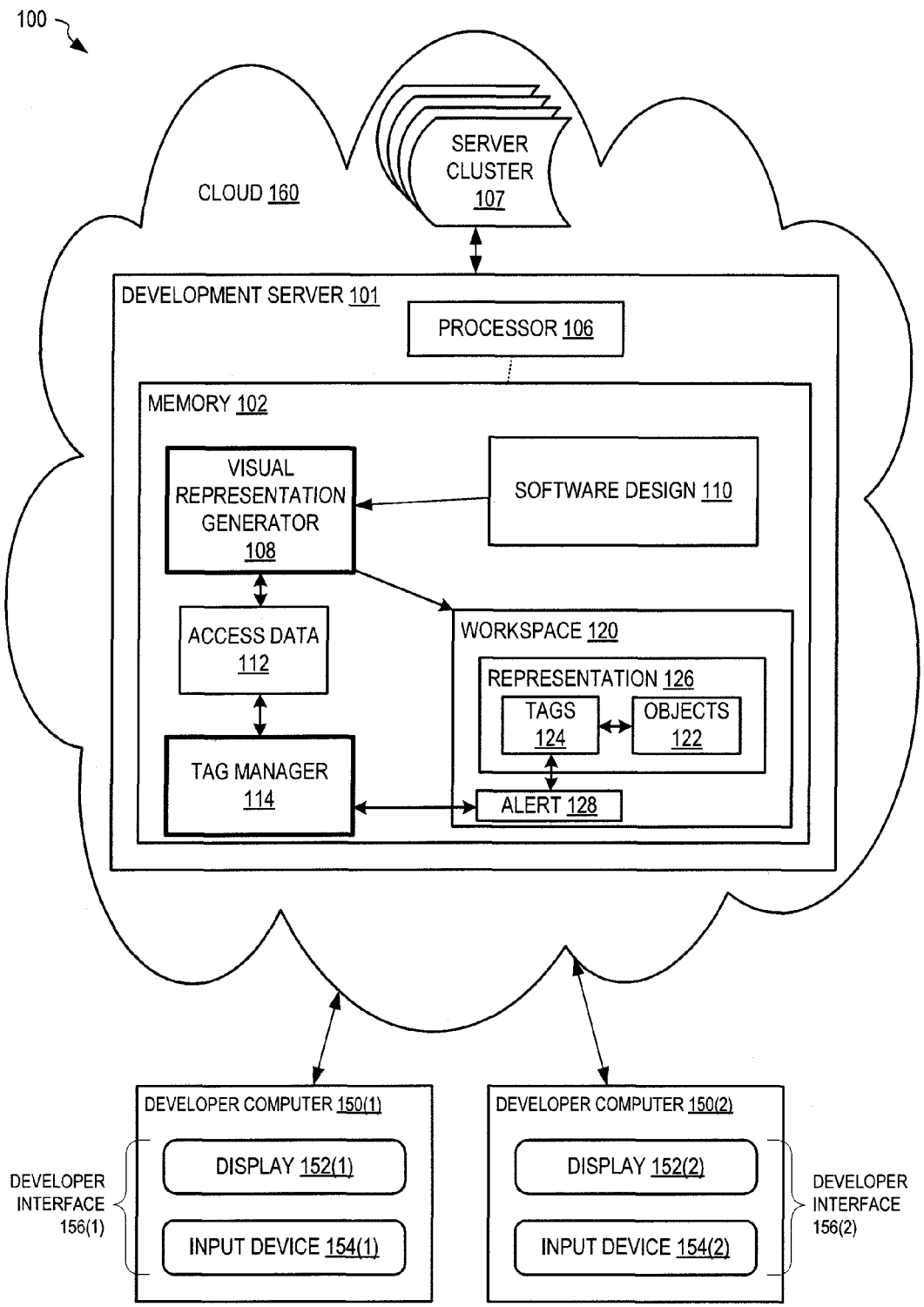
FIG. 1 depicts one exemplary system for tagging objects within a hierarchical software design, in an embodiment.

FIG. 1 depicts one exemplary system 100 for tagging objects within a hierarchical software design 110, in one embodiment. System 100 includes a development server 101 that is located, for example, within a cloud 160. Cloud 160 represents a computer communication network that may include the Internet and other computer networking technologies.

Figure 2:
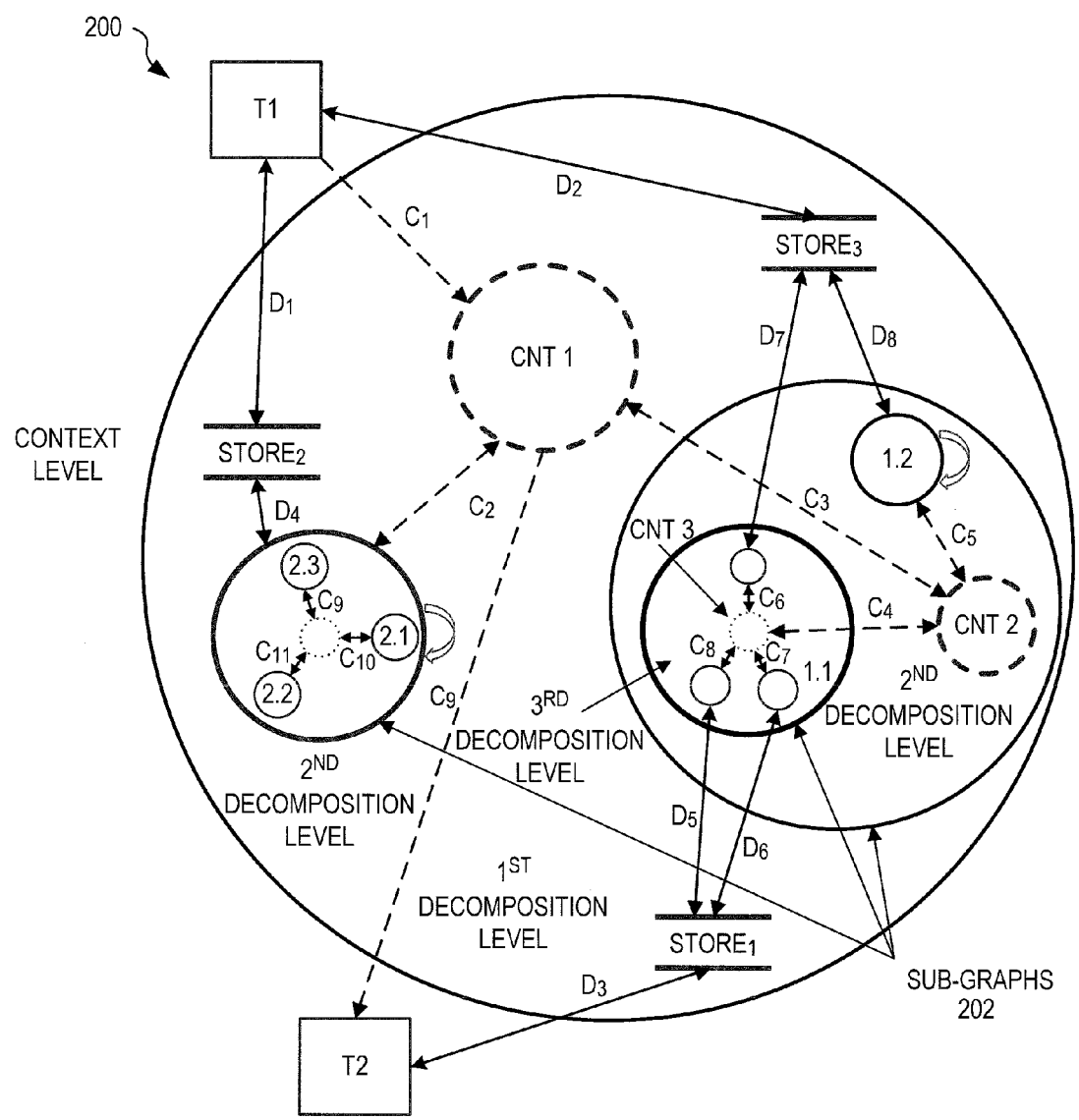
FIG. 2 depicts an exemplary visual representation in the form of a decomposition graph of the software design of FIG. 1.
Figure 3:
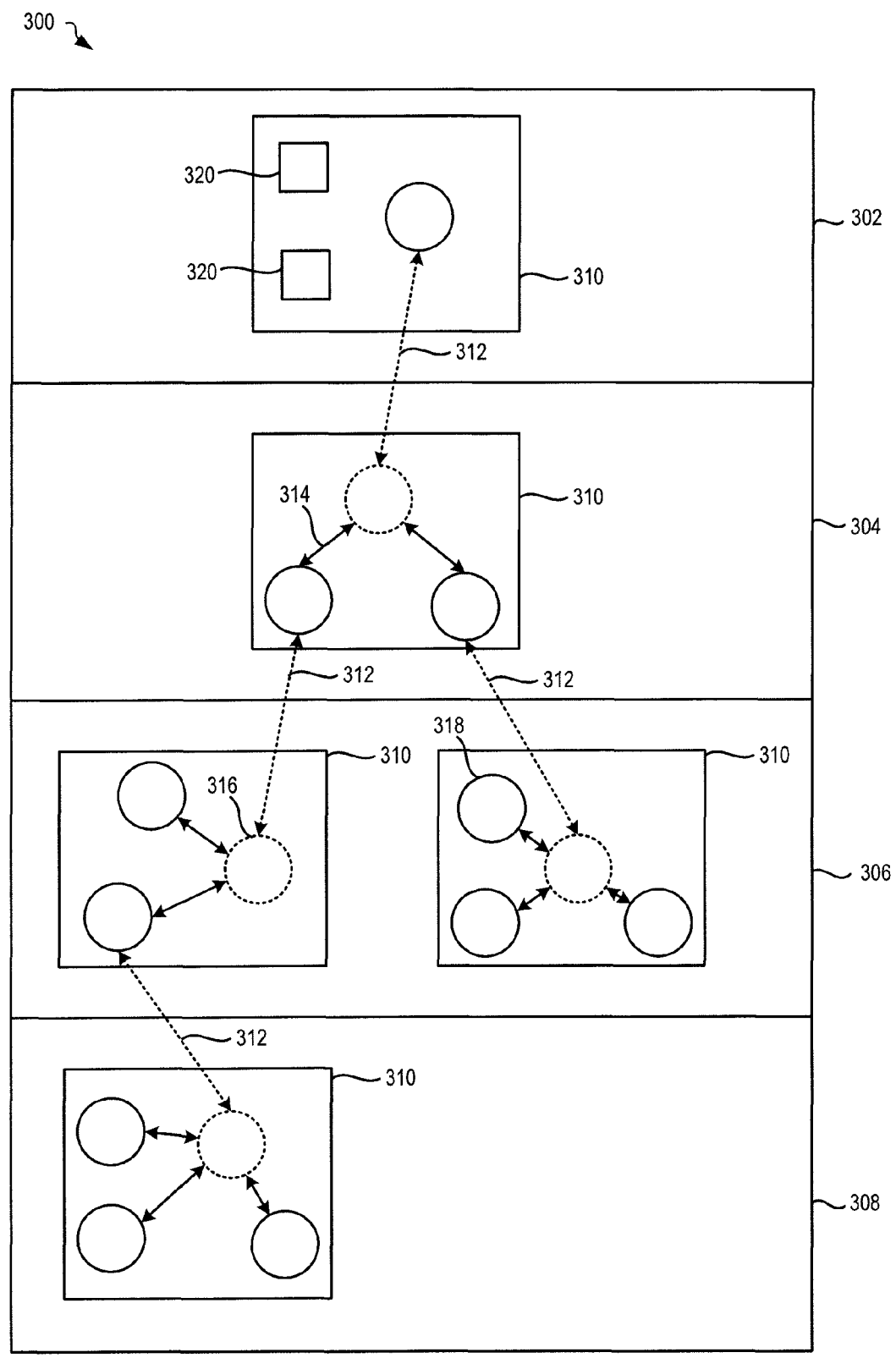
FIG. 3 depicts an exemplary visual representation in the form of a global view showing all decomposition levels, processes and sub-graphs, of the software design of FIG. 1.

Development server 101 has a processor 106 and a memory 102 for storing software design 110 and an associated visual representation 126 of at least part of software design 110. Software design 110 is based upon a massively parallel hierarchical design model that defines work from the most abstract level down to where code occurs, similar to the design model discussed in U.S. patent application Ser. No. 13/425,136 filed Mar. 20, 2012, entitled "Parallelism from Functional Decomposition", and which is incorporated by reference herewith. For example, visual representation 126 may represent one decomposition graph of software design 110, as illustrated in FIG. 2. Similarly, visual representation 126 may represent a global view showing all decomposition levels, processes and sub-graphs within software design 110, as illustrated in FIG. 3.

Memory 102 also stores a visual representation generator 108 that includes machine readable instructions that are executed by processor 106 to generate visual representation 126. Visual representation 126 is displayed within a workspace 120 within which a user (e.g. developer, administrator, and solicitor) operate. For example, workspace 120 is displayed on a display 152 of a developer computer 150 during development of software design 110. Visual representation 126 may include one or more objects 122, each of which represents one or more of a decomposition level, a sub-graph, a process, a control, a control flow, a data store, a terminator, and any combination thereof.

Memory 102 is also shown storing a tag manager 114 that includes machine readable instructions that are executed by processor 106 to generate tags 124. Tags 124 allow users of development server 101 and software design 110 to communicate. Although tags 124 are illustrated within visual representation 126, tags 124 may also be associated with other portions of workspace 120, as will be discussed in further detail below.

Tag manager 114 may also generate an alert 128 associated with tag 124 that is displayed in connection with visual representation 126 and/or workspace 120. Alert 128 informs other users of a newly added tag 124.

Memory 102 may also store access data 112 that defines organization access parameters. For example data 112 may list each organization that has access to software design 110. Access data 112 may also define developers, administrators, solicitors, and other types of users of server 101 that have access to a particular organization. Access for each user may be defined as read only, edit, or none. For example, tags 124 are displayed only to users with at least read only access, and only users with edit access may create a new tag 124.

Figures 4, 5:
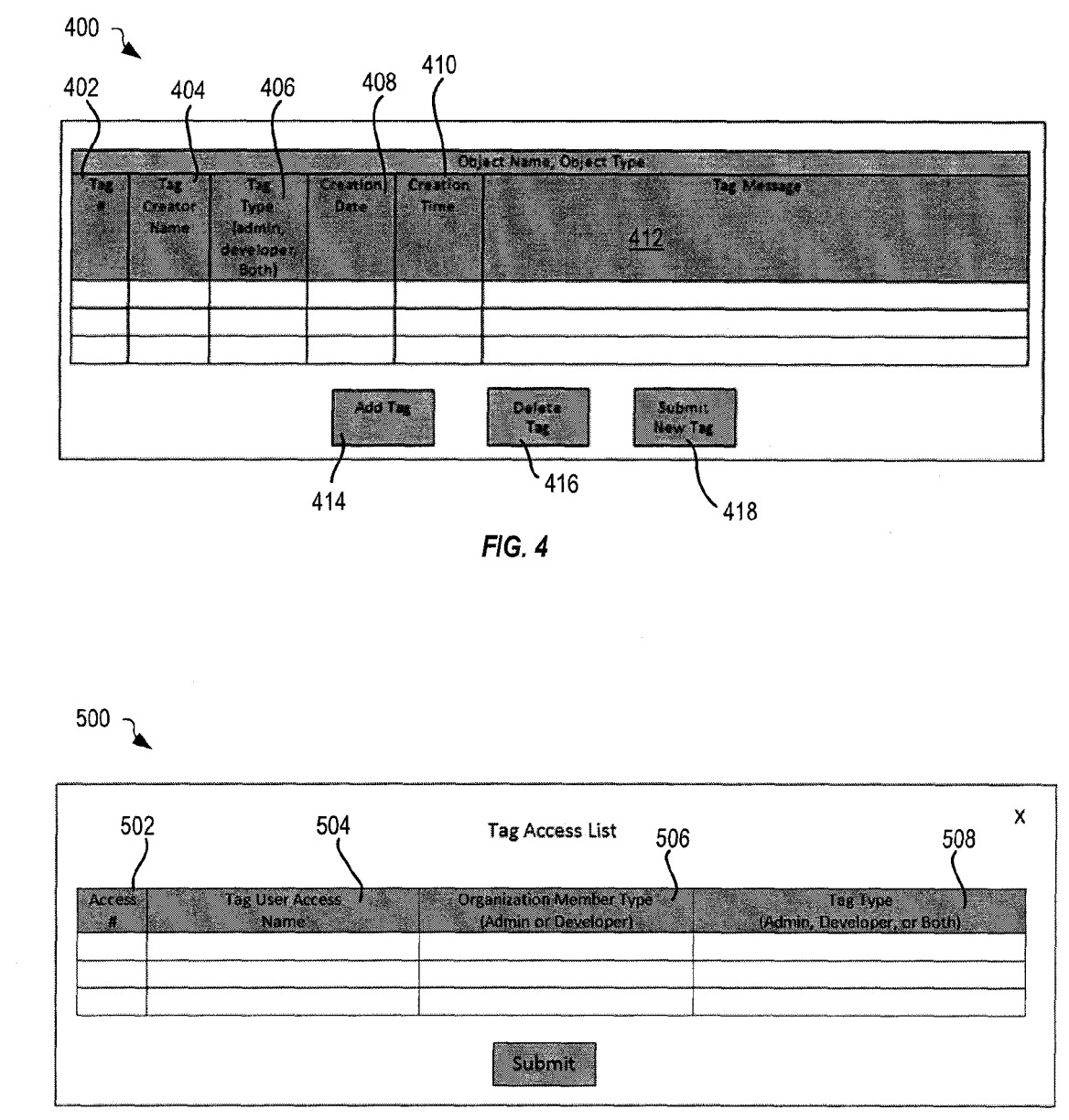

FIG. 5 shows an exemplary access popup window 500 for managing access data 112 of FIG. 1, in one embodiment. Access popup window 500 includes access number 502 defining the users in order of access privilege. Tag user access name 504 defines the user name associated with the access number. Organization member type 506 defines the type of user (e.g. developer, administrator or solicitor) for a particular organization. Access data 112 may be defined for each particular tag 124, or for each workspace 120. Where access data 112 is defined for a particular tag, the access popup window 500 further includes tag type 508 defining the member type, for example administrator and/or developer, to which the tag applies.

FIG. 2 shows one exemplary hierarchical decomposition graph 200 that represents software design 110 of FIG. 1. Within hierarchical decomposition graph 200, dashed lines represent control flows, solid lines represent data flows, dashed circles represent control transforms, solid circles represent process transforms, parallel lines represent data stores and squares represent terminators. Each decomposition level contains one or more sub-graphs 202, wherein there is one sub-graph for each decomposing process. Each sub-graph 202 may be considered a code snippet in the McCabe sense. Note that a process that decomposes into a single lower-level process is invalid as no additional graph information is added. A process may decompose into a sub-graph with a minimum of two processes on it.

FIG. 3 depicts one exemplary global view 300 of software design 110, of FIG. 1. As illustrated in FIG. 3, large squares 310 represent sub-graphs, dashed lines 312 represent control flows, solid lines 314 represent data flows, dashed circles 316 (i.e. control bubbles) represent control transforms, solid circles 318 (i.e. process bubbles) represent process transforms, and small squares 320 represent terminators. In the example of FIG. 3, software design 110 is shown with four design levels 302, 304, 306 and 308. More complex or simpler software designs may be incorporated herein without departing from the scope hereof.

Tagging:

In certain embodiments, tag manager 114 operates to generate and manage tags 124 associated with objects 122 to facilitate communication between developers of software design 110. Tag 124 is a message that is associated with a particular object of software design 110. Tagging allows administrators and developers to add a message to object 122 (and other portions) of software design 110. Adding tag 124 within workspace 120 is considered a change to that workspace portion. Workspace portions include: Developer solicitation, developer acceptance, developer leaving organization, developer task assignments, requirements document, functional decomposition design elements, finite state machine, pseudo-code, test plans and procedures, posts, unposts, publish, unpublish, and the visual representation of software design 110 (for purposes of clarity of illustration, only the visual representation is shown in FIG. 1). The above list of workspace portions is not intended to be limiting in scope. For example, workspace 120 may include more or fewer portions than listed above.

Each object that may be added to or changed within workspace 120 may have a tag 124 with an associated message attached to it. For example, a tag 124 is associated with an object by an "tag" symbol located next to the object. Tags 124 may be viewed by the specified users within an organization. In one embodiment, there are three classes of tagging: administrator, developer, and both. In one embodiment, access data 112 defines each organization, each user within each organization, and each user's access class.

There are several ways to add or view tags within system 100, depending on what the user is viewing within workspace 120. Exemplary ways to add tags include:

1) Right-click a functional decomposition element (i.e. one object 122 within visual representation 126) followed by selecting the "tab" button.
2) Right-click a kernel or algorithm in an algorithm internals screen followed by selecting the "Tab" button.
3) Select the "Tag" button on a Category screen. Although not illustrated, the category screen is located within workspace 120 and defines a category that each object 122 belongs to.
4) Select the "Tag" button on a kernel shell screen. Although not illustrated, the kernel shell screen is located within visual representation 126 and is a graphical object of a control or process kernel.
5) Select the "Tag" button on the algorithm shell screen.
6) Right-click a row in a requirement traceability matrix followed by selecting the "Tab" button. Although not illustrated, the requirement traceability matrix is associated with each object 122 and defines requirements associated with the object either finished or to be finished.
7) Select the "Tag" button on a test plan screen. Although not illustrated, the test plan screen is located within workspace 120.
8) Select the "Tag" button on a test procedure screen. Although not illustrated, the test procedure screen is located within workspace 120 and details associated test procedures with each object 122.
9) Right-click a state in a finite state machine followed by selecting the "Tab" button. Visual representation 126 may be in the form of a finite state machine which shows only the control flows (as state transitions) and processes (as states).
10) Select the "Tag" button on a pseudo-code screen. Although not illustrated, the pseudo-code screen is located within workspace 120 and defines the pseudo-code associated with software design 110.
11) Right-click a Developer or Administrator name on a developers list followed by selecting the "Tab" button.

FIG. 4 shows an exemplary tag popup window 400 generated by tag manager 114 of FIG. 1, in one embodiment. Once a user has elected to add a tag, in accordance with one or more of the above ways, tag manager 114 generates tag popup window 400 within workspace 120. For example, tag popup window 400 may be shown within visual representation 126, or concurrently therewith as a separate window. Tag popup window 400 includes one or more of the following: a tag number 402, a tag creator 404, a tagged object name (not shown), a tagged object type (not shown), a tag type 406, a tag creation date 408, a tag creation time 410, and a tag message 412. Popup window 400 additionally may include one or more of an add tag button 414, a delete tag button 416, and a submit tag button 418.

Each object 122 may have an associated name. The object name may define one of the following: project name; requirements document chapters: purpose, market, product overview, requirements, constraints, workflow, evaluation; high level design element names (as defined by a user); detailed design pseudo-code element names (as defined by a user); detailed design state machine element names (as defined by a user); test plan test number; category name; kernel name; algorithm name; data store name; administrator/developer name; and job title.

Each object 122 may additionally have an associated object type. The following are the possible object types: project, purpose, market, product, requirements, constraints, workflow, evaluation, high level design element, detailed design pseudo-code element, detailed design state machine element, test plan, category, kernel, algorithm, data store, administrator, developer, and job.

Tag number 402 is a sequential number starting with zero used to identify a tag. Each object 122 starts its own tag number sequence. In one embodiment, each sequence only increases therefore when tags are deleted, this will not affect the tag number.

Tag creator name 404 is the name of the user (e.g. developer or administrator) that creates the tag.

Tag type 406 may be selected by any user and defines the type of user who creates the tag, i.e. developer, admin, or both. Where the "admin" tag type is selected then only administrators within the organization, as defined by access data 112, may view the tag. Where the "developer" tag type is selected, then only developers with either read or edit privileges, as defined by access data 112, may view the tag. If the "both" tag type then both administrators and developers with either read or edit privilege, as defined by access data 112, may view the tag. A tag reader may delete any visible tag from their own tag list.

Creation date 408 is automatically generated by tag manager 114 and represents the date when the new tag (i.e. tag 124) was submitted.

Creation time 410 is automatically generated by tag manager 114 and represents the time when the new tag (i.e. tag 124) was submitted.

Tag message 412 is inserted, for example within tag popup window 400, by a user (e.g. a developer or administrator) and represents the primary message communicated by tag 124. In one embodiment, the message consists of any combination of characters, numerals, or special characters and includes a maximum character threshold (e.g. 140 characters).

Once a tag message 412 is inserted, tag manager may represent tag in representation 126. Accordingly, to display the message associated with the tag, tag manager 114 may receive a select tag input from a second user. In turn, tag manager 114 may display message 412 associated with the selected tag to the second user. Alternatively, tag manager 114 may automatically display message 412 within representation 126. In one embodiment, tag manager 114 also generates alert 128 whenever a new tag is created. For example, where a new tag 124 is added in association with an object 122, then an alert 128 is displayed at the bottom of all screens viewing object 122 within workspace 120. In another example, alert 128 is visible to screens that are not viewing object 122 within workspace 120. The alert 128 is displayed only to users having the requisite access data defined within access data 112. When displayed to a user, alert 128 informs that user of any one or more of the following: that an object has been tagged, the tag creator name, the tagged object name, the tagged object type, any other information relative to the tag, or any combination thereof. In certain embodiments only one alert 128 is visible at any time, therefore only the most recent, as defined by tag creation date 408 and tag creation time 410, unviewed tag is shown as an alert. In another embodiment, alert 128 is sent into cloud 160 such that the alert 128 is sent as an e-mail to any user having access privileges.

What is claimed is:

1. A system for communicating between viewers of a software design, comprising:
    a processor;
    memory adapted to store a visual representation of a hierarchical software design having a plurality of objects representing decomposition levels, sub-graphs, processes, controls and control flow indicators within the hierarchical software design
    wherein each decomposition level includes at least one sub-graph having at least two of the processes, and the processes are interconnected via one of the controls and at least one of the control flow indicators; and
    a tag manager, stored within the memory as computer readable instructions that when executed by the processor are capable of:
        receiving a message from a first viewer of the visual representation, the message identifying a change to at least one of the objects,
        generating a tag for storing the message,
        automatically associating the tag with at least one of the objects in the visual representation, and
        displaying the message to a second viewer of the visual representation, wherein the visual representation is concurrently accessible to the second viewer on a different device than the first viewer.

2. The system of claim 1, the tag manager further capable of generating an alert to inform a viewer of the software design of the existence of the tag.

3. The system of claim 1 further comprising access data, defining whether the tag is visible to the viewer, stored within the memory defining access information for each user associated with the system.

4. The system of claim 1, the tag further defining one or more of tag information chosen from the group including: tag number, tag creator, tagged object name, tagged object type, tag type, tag creation date, and tag creation time.

5. The system of claim 2, the alert being displayed concurrently with the visual representation.

6. The system of claim 2, the alert comprising an e-mail that is sent to each user having requisite access privileges to view the tag and the message.

7. The system of claim 1, wherein the displaying the message includes receiving a select tag indication from the second user, and displaying the message associated with the selected tag to the second user.

8. The system of claim 1, wherein the displaying the message includes automatically displaying the message to the second user without selecting the tag associated with the message.

9. A method for generating and managing tags within a software design space, the method comprising:
    generating a visual representation of a hierarchical software design, within a workspace, including a plurality of objects representing decomposition levels, sub-graphs, processes, controls, and control flow indicators within the hierarchical software design,
    wherein each decomposition level includes at least one sub-graph having at least two processes, and the processes are interconnected via one of the controls and at least one of the control flow indicators;
    receiving a message from a first viewer of the visual representation, the message identifying a change to at least one of the objects;
    in response to receiving, generating a tag associated with the at least one of the object;
    automatically associating the tag with the at least one of the objects in the visual representation; and
    displaying the message to a second viewer of the visual representation, wherein the visual representation is concurrently displayed to the second viewer on a different device than the first viewer.

10. The method of claim 9 further comprising generating an alert informing the second user of the generated tag.

11. The method of claim 9, the step of generating a tag comprising generating a tag defining one or more of tag information chosen from the group including: tag number, tag creator, tagged object name, tagged object type, tag type, tag creation date, tag creation time, and tag message.

12. The method of claim 9 further comprising verifying user access based upon access data defining access information for each user associated with the software design space.

13. The system of claim 3, the access data further defining the read or edit privileges of each viewer.

14. The system of claim 1, the tag defining one of the following for the given object: requirements, developer status, testing procedure information, and developer acceptance.

* * * * *